US012316768B2

(12) United States Patent
Wiklof et al.

(10) Patent No.: US 12,316,768 B2
(45) Date of Patent: May 27, 2025

(54) COMPUTER METHOD FOR TRANSMISSION OF A DATA PAYLOAD VIA A BLOCKCHAIN TOKEN

(71) Applicant: Dos Centavos, LLC, Everett, WA (US)

(72) Inventors: Christopher A. Wiklof, Everett, WA (US); Chris Troutner, Anacortes, WA (US)

(73) Assignee: Dos Centavos, LLC, Everett, WA (US)

( * ) Notice: Subject to any disclaimer, the term of this patent is extended or adjusted under 35 U.S.C. 154(b) by 204 days.

(21) Appl. No.: 18/316,141

(22) Filed: May 11, 2023

(65) Prior Publication Data

US 2023/0403171 A1   Dec. 14, 2023

Related U.S. Application Data

(60) Provisional application No. 63/364,557, filed on May 11, 2022.

(51) Int. Cl.
*H04L 9/32* (2006.01)
*G06F 3/04842* (2022.01)
*H04L 9/00* (2022.01)

(52) U.S. Cl.
CPC ........ *H04L 9/3234* (2013.01); *G06F 3/04842* (2013.01); *H04L 9/3213* (2013.01); *H04L 9/50* (2022.05)

(58) Field of Classification Search
CPC ...................................................... H04L 9/3234
See application file for complete search history.

(56) References Cited

U.S. PATENT DOCUMENTS

| | | | |
|---|---|---|---|
| 2020/0136429 A1* | 4/2020 | Susilo | H04W 4/38 |
| 2020/0154278 A1* | 5/2020 | Douglas | H04W 12/08 |
| 2022/0058516 A1* | 2/2022 | Sarin | G06N 7/01 |
| 2022/0255944 A1* | 8/2022 | Chan | H04W 12/72 |

* cited by examiner

*Primary Examiner* — Bradley W Holder
(74) *Attorney, Agent, or Firm* — Launchpad IP, Inc.; Christopher A. Wiklof; James C. Larsen

(57) ABSTRACT

Computer methods and systems provide management of payload data represented by electronic tokens. Applications may relate to asset-backed fungible tokens as well as non-fungible tokens. A payload data file may be added or kept current after initial token genesis by specifying, in token data, a pointer (e.g., as either a TXID specifying a wallet address as an endpoint, or as the wallet address) to one or more transactions that carry, such as in an OP_Return field, a link to a linking payload or to the added or current payload data file. A single transaction specifying the wallet address may thus update or enhance any number of electronic tokens linked to the payload data file.

20 Claims, 14 Drawing Sheets

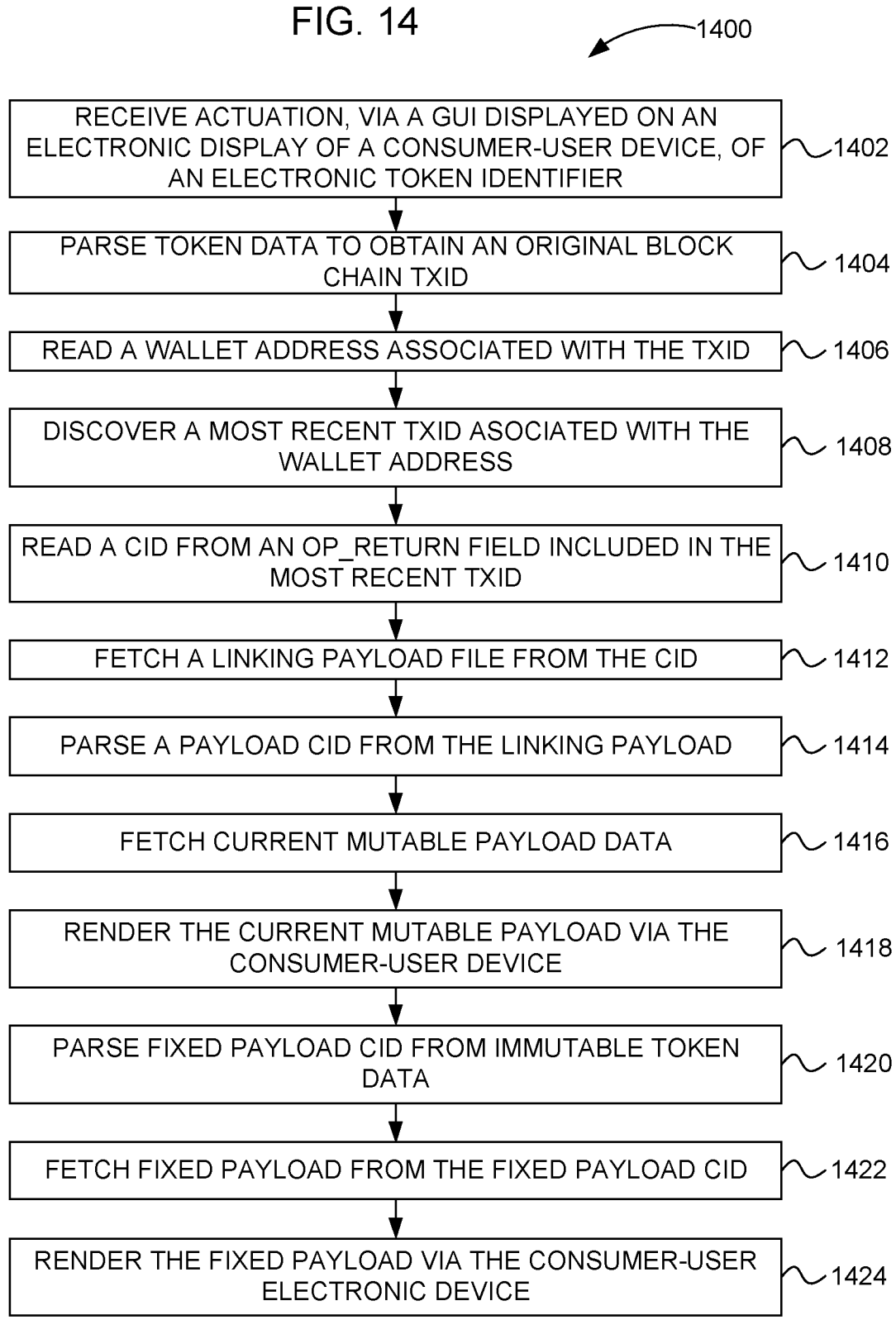

COMPUTER METHOD FOR TRANSMISSION OF A DATA PAYLOAD VIA A BLOCKCHAIN TOKEN

CROSS-REFERENCE TO RELATED APPLICATIONS

The present application claims priority benefit from U.S. Provisional Patent Application No. 63/364,557, entitled "COMPUTER METHOD FOR TRANSMISSION OF A DATA PAYLOAD VIA A BLOCKCHAIN TOKEN," filed May 11, 2022; which, to the extent not inconsistent with the disclosure herein, is incorporated by reference.

SUMMARY

According to embodiments, a computer method includes providing a graphical user interface (GUI) for loading "mutable" data "into" a "non-fungible token" (NFT) in a way that guarantees data integrity of the mutable data. According to embodiments, successively loaded mutable data is tracked as a succession of respective blockchain transactions (TXs), each of which carries a link to target data. In an embodiment, the successively loaded mutable data is at least partially collectively addressable, each instance of the collective part providing data corresponding to an aspect of the collective whole. In another embodiment, the successively loaded mutable data provides a record of changes wherein, according to a given application, only a most recent transaction is regarded as referencing valid current data.

According to an embodiment, a computer method for providing access to payload data using an electronic token includes transmitting, from a server computer to a user device via an internetwork, data to cause electronic display, to a user, of a use-case graphical user interface including a GUI control operatively coupled to a command to establish a current payload file corresponding to a designated electronic file and receiving, into the server computer, the command from the user for establishing the current payload file by the server computer. The computer method further includes storing, with the server computer, the current payload file at a current payload network address, creating, with the server computer, a linking payload, the linking payload carrying a reference to the current payload network address, and establishing, with the server computer, a static link network address different than the current payload network address for accessing the linking payload. The server computer executes a linking transaction to associate the linking payload with the static link network address. The server computer executes a genesis transaction to generate an electronic token referencing the static link network address or an instance of the linking transaction identity (TXID) as carried data.

According to an embodiment, a non-transitory computer-readable medium carries computer instructions to cause a computer to execute the method of transmitting, from a server computer to a user device via an internetwork, data to cause electronic display, to a user, of a use-case graphical user interface (GUI) including a GUI control operatively coupled to a command to establish a current payload file corresponding to a designated electronic file and receiving, into the server computer, the command from the user for establishing the current payload file by the server computer. The non-transitory computer-readable medium further carries computer instructions to cause the computer to execute storing, with the server computer, the current payload file at a current payload network address, creating, with the server computer, a linking payload, the linking payload carrying a reference to the current payload network address, and establishing, with the server computer, a static link network address different than the current payload network address for accessing the linking payload. The computer-readable medium further includes computer instructions to cause the server computer to execute a linking transaction to associate the linking payload with the static link network address and execute a genesis transaction to generate an electronic token referencing the static link network address or an instance of the linking transaction identity (TXID) as carried data.

According to an embodiment, a computer method for linking an electronic token to a computer file includes receiving, from a user via a graphical user interface into a server computer, a designation of a computer-readable electronic file for linking to an electronic token; storing the electronic file at a location in a content-identified network storage system; determining a content identifier (CID) corresponding to the storage location of the electronic file; and broadcasting a blockchain transaction carrying the CID, the blockchain transaction specifying, as an end point, a wallet address at least indirectly referenced by data associated with the electronic token.

According to an embodiment, a computer method for updating a payload file corresponding to a previously generated electronic token referencing a specified electronic wallet includes displaying an update-token button in a creator-user graphical user interface on an electronic display of a creator-user computing device and receiving actuation of the update-token button in the GUI by the creator-user. The method further includes receiving a designation of a new computer file for use as a new current payload from the creator-user via the creator-user graphical user interface; saving the designated computer file at a payload CID; inserting the payload CID into a new metadata file; saving the new metadata file at a new metadata CID; and broadcasting a blockchain transaction carrying the new metadata CID, the blockchain transaction specifying the referenced electronic wallet as an endpoint. In this way, the electronic token is updated to link to the new computer file.

According to an embodiment, a computer method for responding to an actuation of a displayed electronic token identifier includes receiving actuation into a server computer, by a consumer-user via a GUI displayed on a consumer-user electronic device, of an electronic token identifier; parsing, from token data associated with the electronic token, a block chain transaction identity (TXID) associated with at least one payload data file; reading an electronic wallet address endpoint associated with the TXID; and discovering a most recent block chain TXID associated with the electronic wallet address. The method continues with reading, from carried data associated with the most recent block chain TXID, a content identifier (CID); fetching current payload data corresponding to the CID from a content-identified storage network; and rendering the current payload data to the consumer-user via the consumer-user device. In an embodiment, fetching current payload data corresponding to the CID includes fetching a linking file stored at the CID; parsing, from the linking file, a payload data CID; and fetching the current payload data from the payload data CID.

BRIEF DESCRIPTION OF THE DRAWINGS

FIG. 14 is a flow chart showing a computer method for responding to an actuation of a displayed electronic token identifier corresponding to a "mutable-data" token, according to an embodiment.

DETAILED DESCRIPTION

Figure 1:
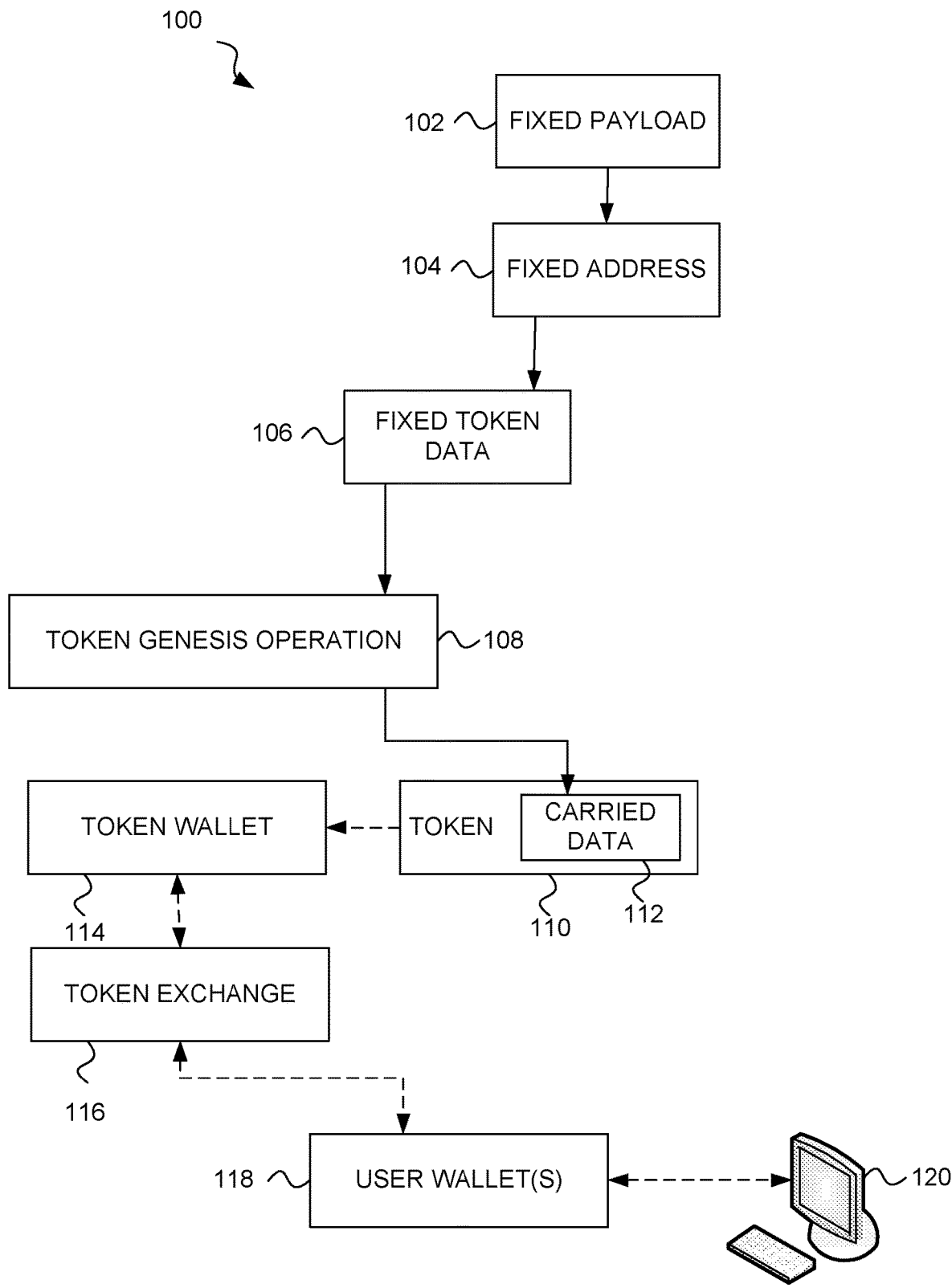
FIG. 1 is a diagram showing relationships between a token genesis operation and an electronic token, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

As used herein, the terms non-fungible token and NFT refer to an electronic token that represents one or more pieces of payload data. NFTs are not considered to be interchangeable with a population of fungible tokens used to carry generic value for use as non-fiat interchange in commerce. Indeed, an NFT may be bought, sold, traded, etc. with a value determined in fungible tokens, with a focus on uniqueness and/or scarcity of the payload data represented by the NFT.

As used herein, the term payload refers to an arbitrary binary object representing a computer file intended by a first user to be represented by an NFT. The first user may, for example, literally select a computer file (e.g., a GIF, PDF, IMG, EXE, DOCX, XLSX, digital photo, or other computer file format) displayed in a graphical user interface (GUI) of an electronic device to be included in a payload. For example, the user may select a computer file they wish to be referred to (i.e., linked to) by the NFT, thereby providing, to a second user, known or unknown to the first user, access to the payload. The payload may include an encrypted version of the selected computer file. According to embodiments, the payload represents a real-world object and/or legal object such as a contract, title, offer of sale, bid for sale, bill of sale, non-disclosure agreement, trade secret, etc.

According to another embodiment, the first user may literally select a control corresponding to a real-world object or flow. For example, the first user may cause the electronic device to photograph or video a newly-planted tree, a solar array, an electric meter or other object to which the first user attests corresponds to an act of planting or transplanting (or paying for planting) a tree, installation or refurbishment of a solar array paid for by the first user, or electric consumption corresponding to a residence or building owned or rented by, respectively, the first user. In this example the selection of the control corresponding to the real-world object or flow may be received by a remote server (remote to the user's electronic device and optionally remote from a server computer(s) executing at least a portion of steps corresponding to computer methods described and claimed herein) running an application that receives attestations and evidence corresponding to the photographed or otherwise recorded real world object, filters the received evidence, looks up a credit value corresponding to the filtered evidence, and issues or updates an NFT under first control by the first user. For example, the credit value may comprise a carbon credit value corresponding to the filtered evidence.

Accordingly, the payload may act as evidence, viewable by a token holder or prospective token holder (aka, second user). A token "carrying" or linked to the payload may be generated (e.g., using a genesis transaction that broadcasts the new token to a blockchain) or updated (according to methods described herein) that represent a (fractional) carbon credit corresponding to an action (e.g., saving energy) or payment for providing a desirable measure (e.g., planting a number of specie(s) of tree(s), to reduce carbon otherwise in the air as carbon dioxide documented or attested to by the payload. The first user may optionally sell the NFT to the second user or may donate the NFT to a charitable organization. NFTs, such as "carbon credit NFTs" may be aggregated by the second user or charitable organization and sold to carbon emitters.

According to another example, a payload may correspond to an intellectual property (IP) right, such as a right to a fractional monetary benefit from a patent, right to purchase a commodity at a place and time, right to own a patent, and/or right to contractually defined benefit. According to an embodiment, "burning" the NFT may convey the IP right, whereas selling or otherwise transferring the NFT may transfer the right.

According to another example, a payload may correspond to a right to a (lithographic or other) print. For example, "burning" the NFT may cause an original artist or representative/dealer of the original artist to (optionally print and) to transmit the print to a second user who purchased the print by "burning" the NFT. Additionally, or alternatively, the payload may correspond to a right to an original artwork represented by the photolithographic print.

According to another example, a payload may correspond to a right to a 3D printed, cast, machined, or otherwise reproduced sculpture, part, decorative, or other object (collectively, object). For example, "burning" the NFT may cause a first user or agent thereof to (optionally create and/or pull from inventory, and) transmit the reproduced object to a second user who purchased the object by "burning" the NFT. Additionally, or alternatively, the payload may correspond to a right to an original 3D object (e.g., the sculpture, part, decorative, or other object). It is contemplated that holding an object in custody of or in escrow by a trusted party may satisfy a payment transaction for purchasing the object.

The term non-fungible token (aka NFT) refers to a non-divisible electronic token made according to a selected standard, for example a standard compatible with Ethereum or compatible with one or more unspent transaction output (UTXO) blockchain(s), such as Bitcoin (BTC), Bitcoin Cash (BCH), E-Cash (XEC), or Ava Labs Avalanche (AVAX) supporting at least one transaction memo field (e.g., an Op_Return field). According to an embodiment, the electronic token may be a simple ledger protocol (SLP) token. In an example, the token may be a mutable data Type 1 SLP token, according to an open source (e.g., Gnu Public License (GPL V2)) specification for the Type 1 SLP token made according to at least a portion of the computer method described herein and equivalents thereof.

According to embodiments, instantiation of computer methods described herein may be caused by constructing JavaScript language computer programs that access a rest API provided by a server corresponding to a nameserved uniform resource locator at a uniform resource locator (url) including a string "fullstack.cash". According to other embodiments, instantiation of computer methods described herein may be caused by constructing JavaScript language computer programs that access open-source computer programs identified and documented by "Github". Some particularly useful libraries may be administered by Permissionless Software Foundation (PSF). Some executable code sets may be available via "Digital Ocean". Computer methods described herein may further be accessed via a ("Web 2") rest API or via "Web 3" transactions performed by embodiments provided as a web application or downloadable application.

FIG. 1 is a diagram 100 showing relationships pertaining to an electronic token 110, such as a non-fungible token (NFT), according to an embodiment. A fixed payload 102 consisting of a computer-readable electronic file is saved onto a network storage system at a fixed network address 104. The payload 102 may be electronic artwork, an audio or video file, or an electronic contract, for example.

A token genesis operation 108 creates a new electronic token 110 representing the fixed payload 102 by inserting the fixed address 104 into fixed, immutable token data 106 during a token creation transaction that creates the token 110 in a token wallet 114. The token creation, including carried data 112 that, in turn, includes the fixed address 104, is broadcast across a blockchain to obtain consensus on the creation of the token 110.

As indicated above, a set of token carried data 106, 112 includes a reference to the fixed network address 104. Typically, the fixed network address 104 is content-specific, for example a CID, meaning that only the original fixed payload may be retrieved by a token holder. According to an embodiment, the token genesis operation 108 specifies a Simple Ledger Protocol (SLP) token. For example, the fixed token data 106 may specify genesis of a SLP type 1 token, which may optionally be used as a fungible token, by setting parameters for creating the token as compatible with use as an NFT. This may be done by specification of non-divisibility (<decimals> or "decimals": being set to 0) and by outputting no minting baton (<mint_baton_vout>, also referenced as "mintBatonIsActive", being set to false). For an NFT application using a single unique token, <initial_token_ming_quantity> (also referenced as "total minted:") may be set to 1.

An example structure of a token carried data structure for an SLP token is shown below, as EXAMPLE 1:

---
EXAMPLE 1
---
OP_RETURN
  <lokad_id: 'SLP\x00'> (4 bytes, ascii)1
  <token_type: 1> (1 to 2 byte integer)
  <transaction_type: 'GENESIS'> (7 bytes, ascii)
  <token_ticker> (0 to ∞ bytes, suggested utf-8)
  <token_name> (0 to ∞ bytes, suggested utf-8)
  <token_document_url> (0 to ∞ bytes, suggested ascii)
  <token_document_hash> (0 bytes or 32 bytes)
  <decimals> (1 byte in range 0x00-0x09)
  <mint_baton_vout> (0 bytes, or 1 byte in range 0x02-0xff)
  <initial_token_mint_quantity> (8 byte integer)

The fixed payload 102 is typically referenced by the token_document_url. While this may include any valid network-addressable address, a content identifier (CID) value corresponding to content-identified fixed payload data file disposed in a specified content-identified storage network such as IPFS is typically used and recommended by the inventors. According to embodiments, the fixed payload 102 may include an image, audio, video, or other file that is inextricably linked to the token, shown as 1006 in FIGS. 10 and 11.

The token_document_hash, in the prior art, may have typically been left at zero bytes.

According to embodiments, the token_document_hash carries a value for linking to non-fixed, or mutable data. In an embodiment, the token_document_hash field carries a blockchain transaction identifier (TXID) for an original or initial blockchain transaction specifying blockchain wallet address to be associated with the mutable data.

The TXID is a unique label for a previous blockchain transaction with carried data. The carried data, such as OP_Return data, includes a pointer to a network storage location. This is not to be confused with a broadcast token genesis transaction identifier, also referenced as Token ID.

In an example, the <token_document_hash> ultimately points to a content identifier (CID) in a specified network storage system. includes carried data including an OP_RETURN field carrying a URL or content identifier (CID). The CID is a multi-hash of the fixed payload, and also acts as an address for retrieving the fixed payload from a network storage system, such as from the Inter-Planetary File System (IPFS). Since the CID is content-determined, any change to the fixed payload would result in a different CID. Thus, the holder of the token is assured that the token payload has not been changed. In other words, this structure ensures that the token is immutable.

In an embodiment, to retrieve the fixed payload, the token_document_hash is loaded into a blockchain explorer, which may be a command line blockchain explorer. The blockchain explorer returns the fixed blockchain wallet address associated with mutable data transactions. The fixed blockchain wallet address is queried to determine a most recent TXID associated with the wallet. The most recent TXID is read, again with a command line blockchain explorer called by a mutable data management computer process, to read the most recent particular TXID (which may be the original TXID if mutable data has not been changed since token genesis) and its associated OP_RETURN field. The IPFS CID is parsed from the OP_RETURN field, and used, at least ultimately, to retrieve the mutable data payload associated with the mutable data CID from IPFS.

In the case of a simple ledger protocol (SLP) token, the token minting transaction is similar to a cryptocurrency transfer in that the fixed address is included in a memo field in the transaction. In the case of Bitcoin Cash (BCH), the memo field used is referred to as an OP_RETURN field that may be found by anyone using a block explorer (according to Indexer capabilities). In this case, the token 110 is identified by a token identity (ID) that is the same as the transaction ID (TXID) in which the token is created.

A token exchange 116 may facilitate transfer of the token 110 from the token wallet 114 to a user wallet 118, which is generally controlled by a graphical user interface (GUI) displayed on an electronic display of a user electronic device 120.

Typically, the user may view the token payload 102 by accessing the fixed network address 104 included in the electronic token 110.

The types of interactions with token payloads 102 are typically quite limited. In many cases, the user may simply view a graphical image 102 in the user wallet 118 or optionally trade the token 110 via the token exchange 116 to another user wallet 118.

Figure 2:
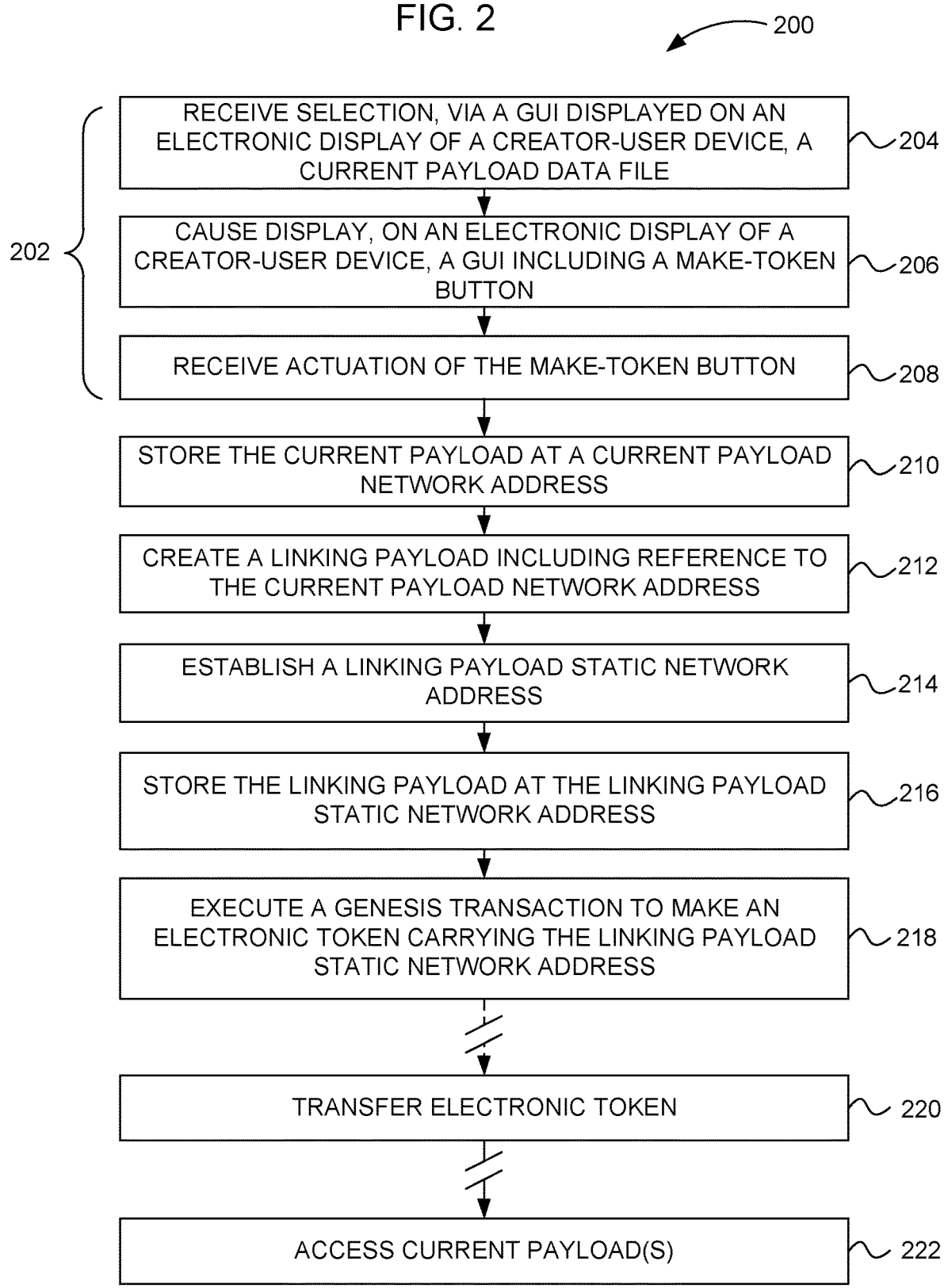
FIG. 2 is a flow chart showing a computer method for providing access to payload data using an electronic token, according to an embodiment.
Figure 3:
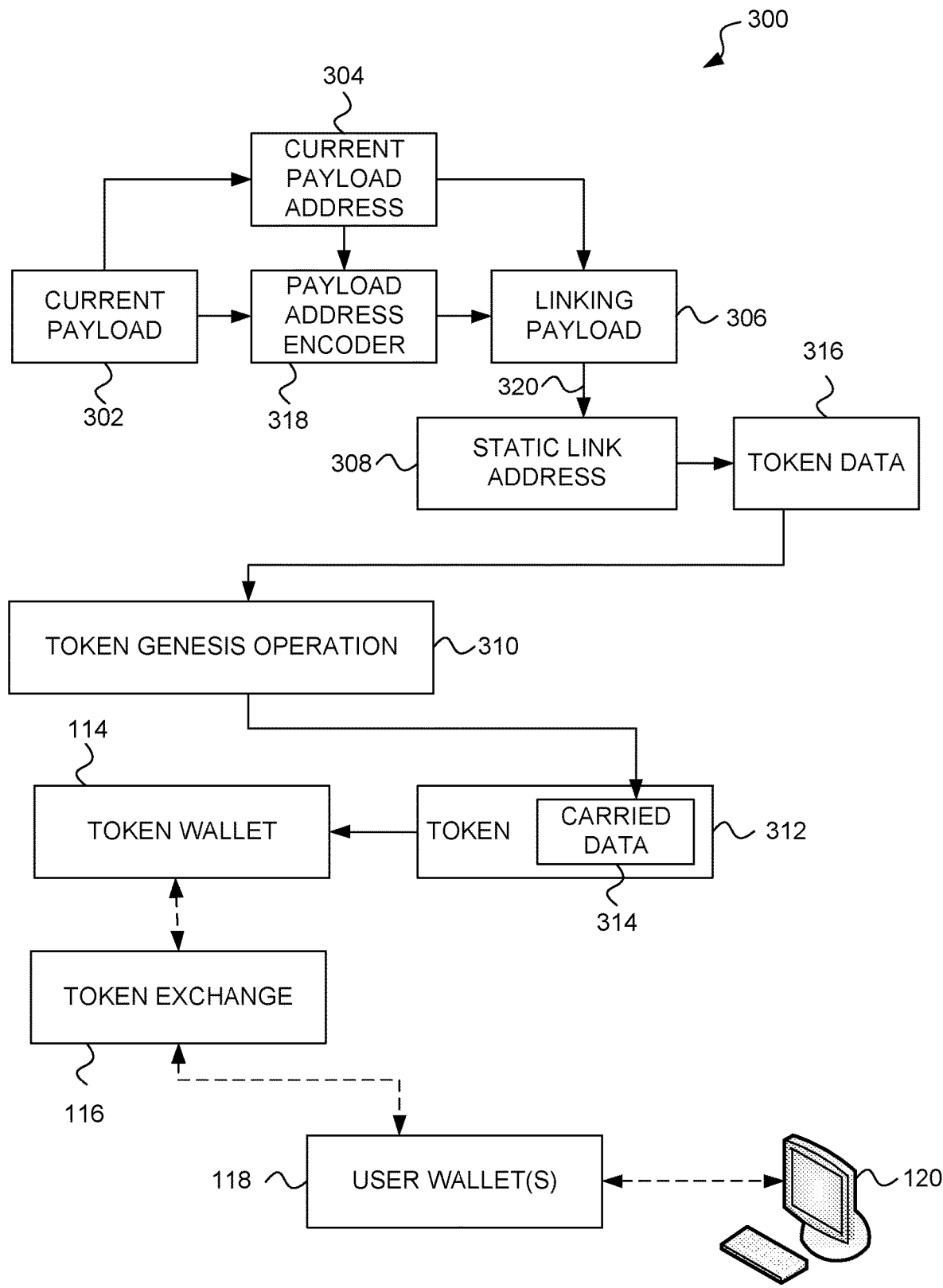
FIG. 3 is a diagram showing relationships between payload data and an electronic token representing the payload data, according to an embodiment.

FIG. 2 is a flow chart 200 showing a computer method for providing access to payload data using an electronic token, according to an embodiment. FIG. 3 is a diagram showing relationships 300 between payload data and an electronic token representing the payload data, according to an embodiment.

Referring to FIGS. 2 and 3 (and/or FIGS. 10 and 11), a computer method 200 for providing access to payload data using an electronic token 312 may include (not shown) transmitting, from a server computer to a user device 120 via an internetwork, data to cause electronic display to a user, a use-case graphical user interface (GUI) including a GUI control operatively coupled to a command to establish a current payload file 302 corresponding to a designated electronic file. As shown in step 202, the method 200 may include receiving, into the server computer, the command from the user for establishing the current payload file 302 by the server computer. Step 210 may include storing, with the server computer, the current payload 302 at a current payload network address 304. Step 212 may include creating, with the server computer, a linking payload 306, the linking payload 306 carrying a reference to the current payload network address 304. Step 214 may include establishing, with the server computer, a static link network address 308 different than the current payload network address 306 for accessing the linking payload 306. Step 216 may include executing, with the server computer, a linking transaction 320 to associate the linking payload 306 with the static link network address 308, for example, such that a query of the static link network access will access the linking payload 306. Step 218 includes executing, with the server computer, a genesis transaction 310 referenced to a token wallet 114 to generate an electronic token 312 referencing the static link network address 308 as carried data 314.

Figure 4:
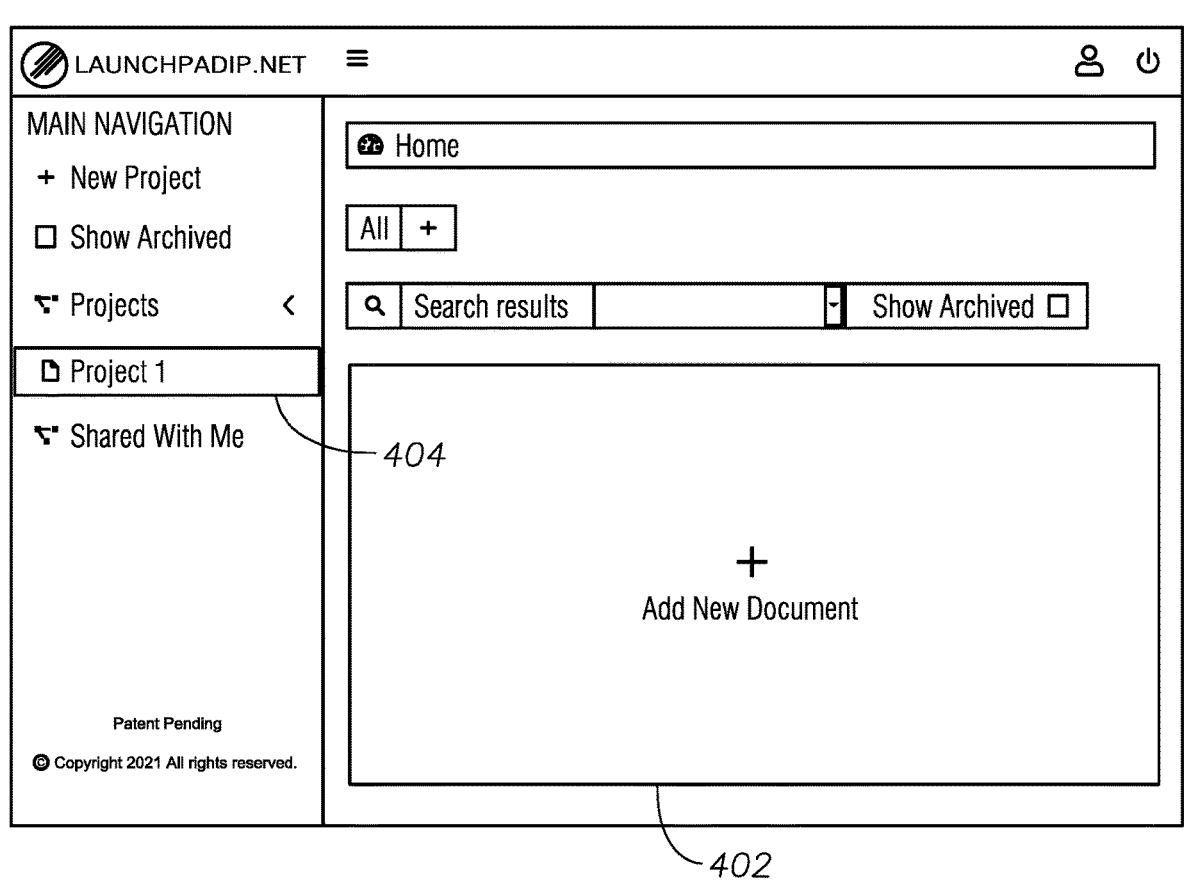
FIG. 4 is a diagram showing a graphical user interface (GUI) for controlling creation of an electronic payload (also referred to as payload data) in the context of an electronic (HD) wallet (shown as "Project 1" in the GUI), according to an embodiment.

FIG. 4 is a diagram showing a graphical user interface 400 including an add-new-document control 402 for creating a payload (document), according to an embodiment. According to an embodiment, adding a new document is always performed in the context of a project 404, a project 404 corresponding to an electronic wallet compatible with a blockchain. When a user actuates the add-new-document control 402, an application that displays a graphical user interface 500 including a display and controls 504 shown in FIG. 5, according to an embodiment.

Figure 5:
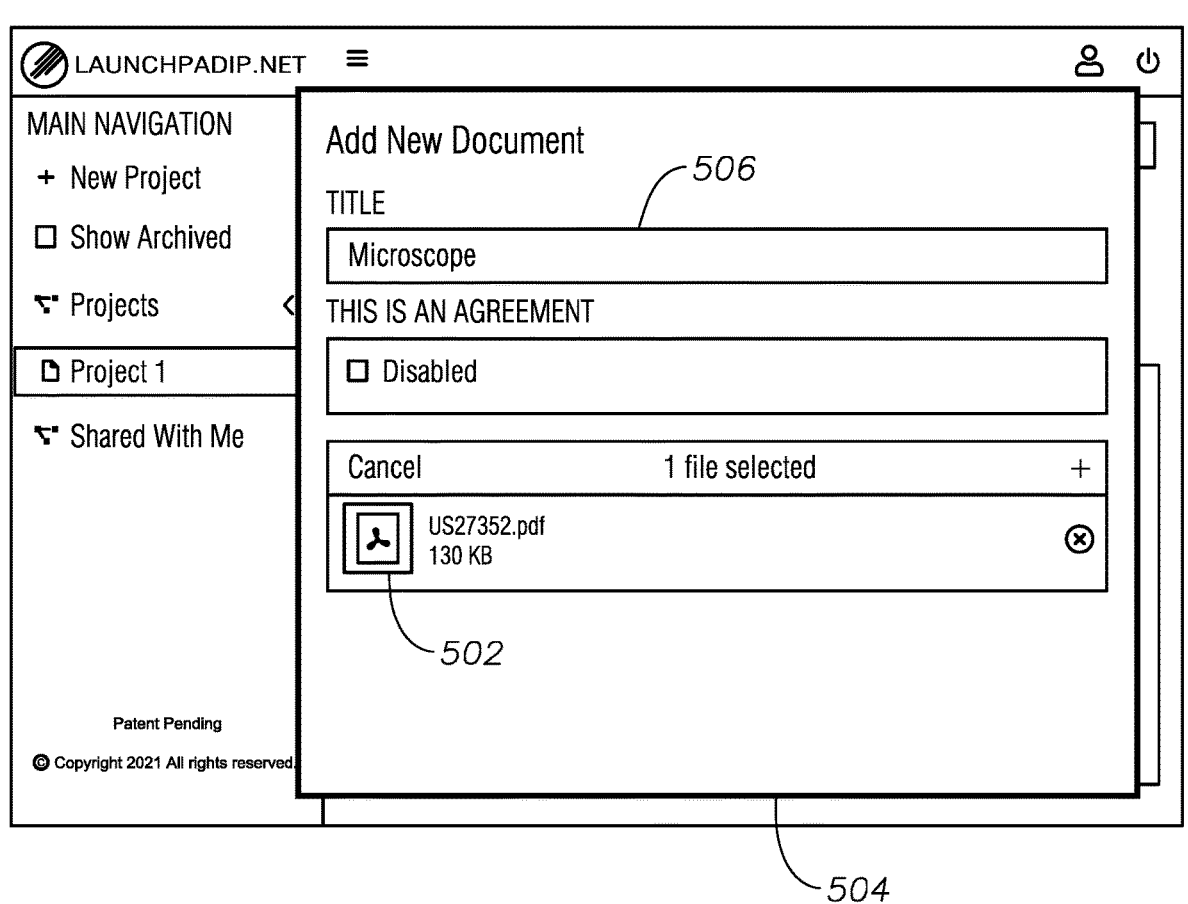
FIG. 5 is a diagram of a graphical user interface for controlling parameters associated with the payload of FIG. 4, according to an embodiment.

FIG. 5 is a diagram of a graphical user interface 500 including an add-new document display and controls 504, according to an embodiment. According to an embodiment, the graphical user interface 500 in the add-new-document display and controls 504 provides a control region for a user to specify a file 502 to upload as a payload, and a control 506 for providing a title for the payload. In the example, the user has specified a file represented by an icon 502 from a local or cloud drive entitled US273752.pdf, and has specified a title "Microscope" in the control 506. Another control not shown provides a user an ability to select "commit-to-blockchain". Upon actuation of the "commit-to-blockchain" control, the server computer optionally encrypts the file, causes the selected file(s) to be saved to a network storage location, e.g., at a content identifier (CID) specific to the content of the file, and broadcasts a blockchain transaction, the blockchain transaction including carried data referencing the network storage location of the payload. This may include ultimately specifying the network storage location of the payload via an intermediate object, such as via metadata.

Figure 6:
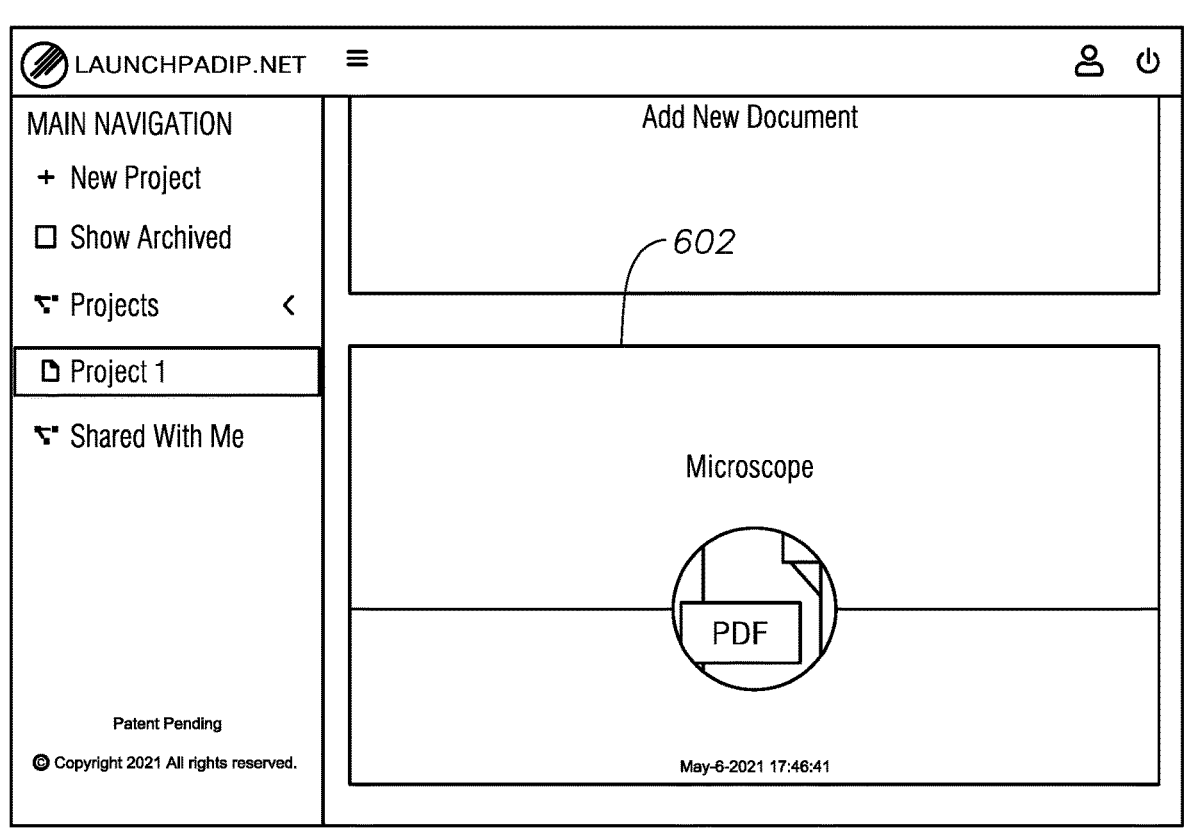
FIG. 6 is a diagram showing a graphical user interface including a display (and control) referencing the uploaded payload of FIGS. 4 and 5, according to an embodiment.
Figure 7:
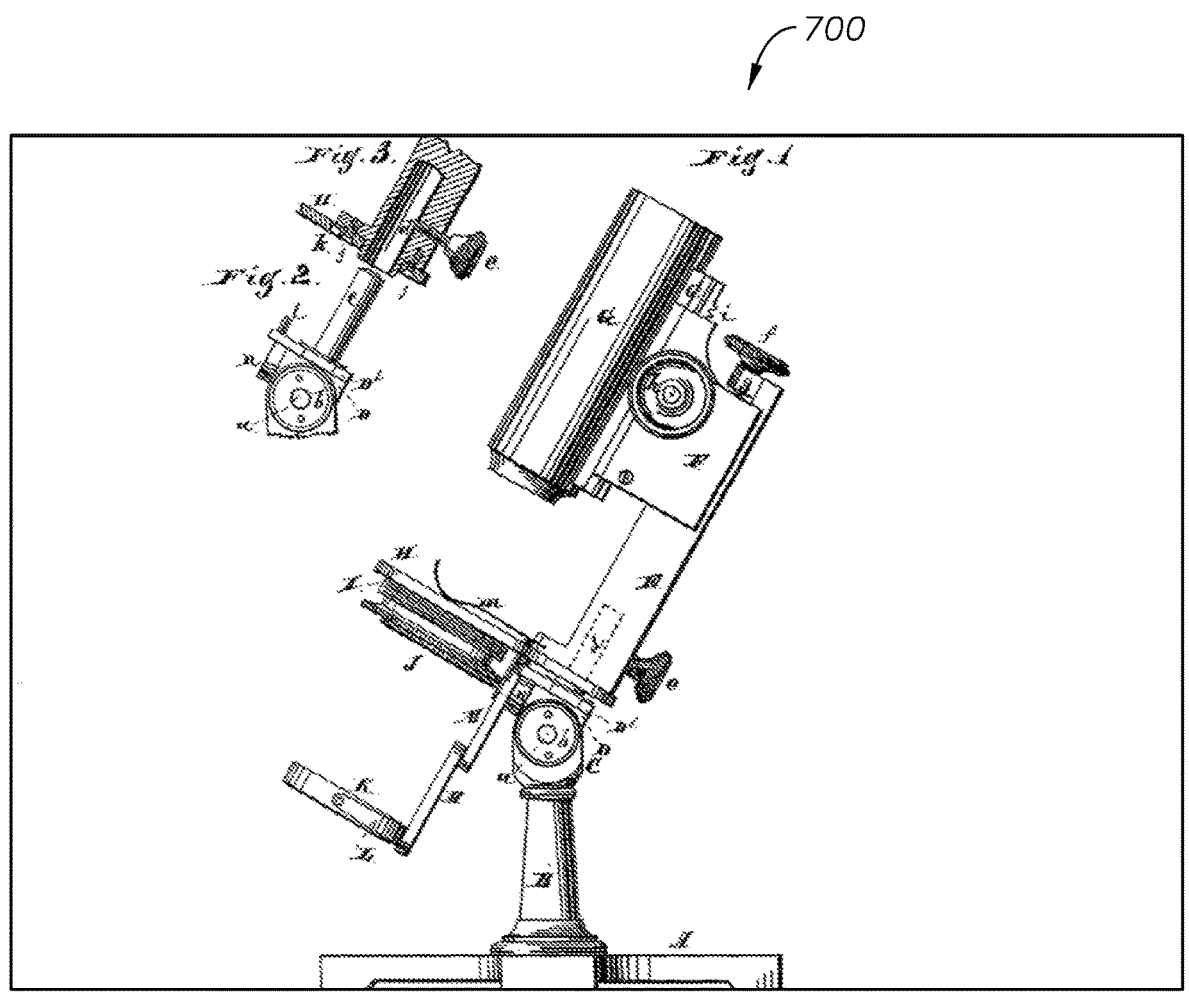
FIG. 7 is an image of a displayed payload, according to an embodiment.

FIG. 6 is a diagram of a graphical user interface 600 including a display and control 602 referencing the uploaded payload, according to an embodiment. The display 602 referencing the uploaded payload includes a listing of the payload entitled "Microscope", an icon indicating the file-type (PDF), and the date and time that the blockchain transaction registering the payload was broadcast or, alternatively, proved and added to a block stack of the blockchain. The graphical user interface 600 illustrates an output to the user indicating that a current payload file 302 is established in the server computer, according to step 202 of FIG. 2. When a user actuates the control 602, the server computer may display the (optionally decrypted) payload, shown in FIG. 7, and/or or may open a payload control display and controls 802, shown in FIG. 8. FIG. 7 is an image of a displayed payload 700, according to an embodiment. In the example, a portion of U.S. Pat. No. 273,752 is displayed to the user. Other types of payloads are disclosed herein and contemplated by the inventors.

Figure 8:
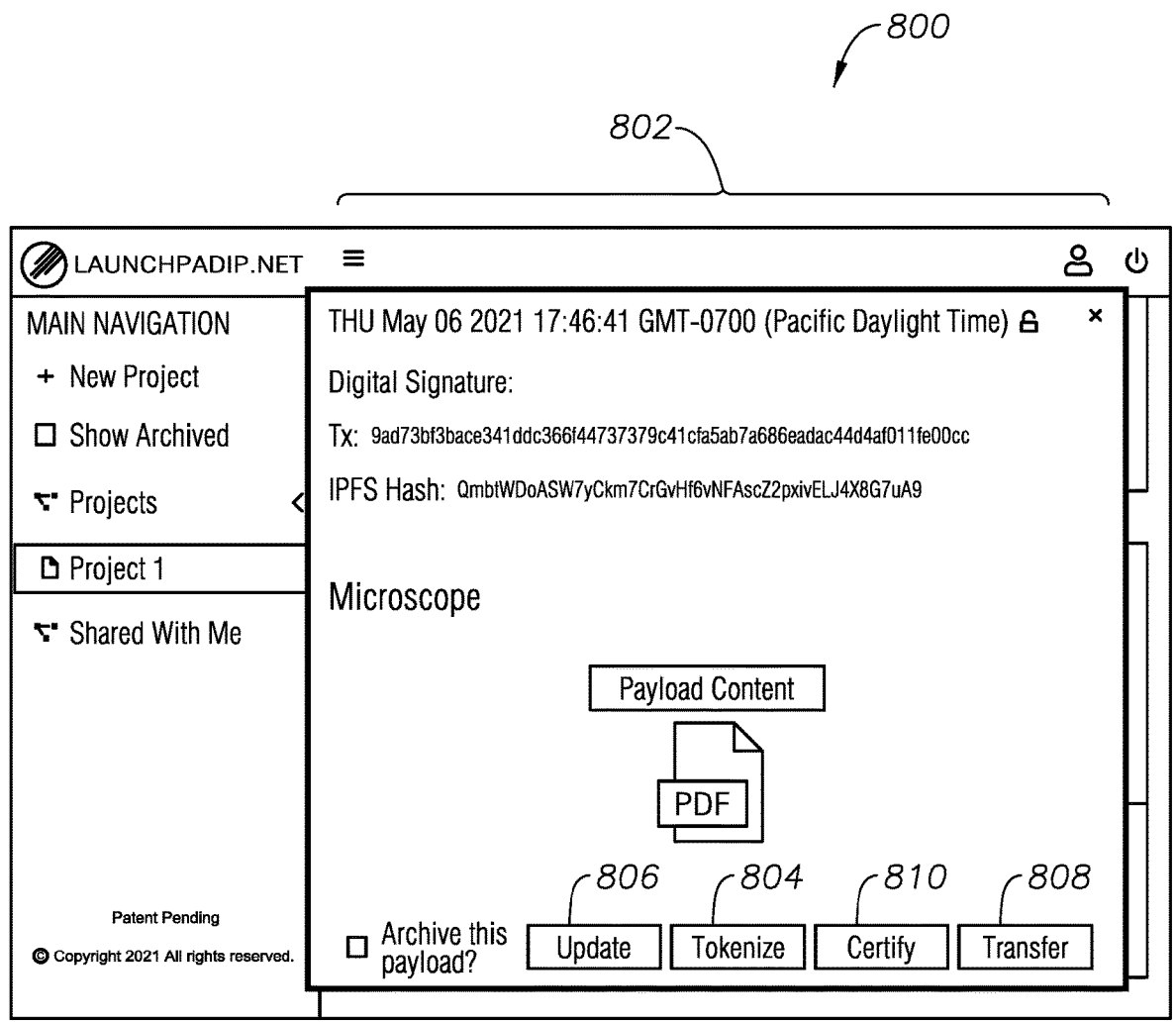
FIG. 8 is a diagram showing a graphical user interface including a payload control display and controls for controlling transactions related to a current payload, according to an embodiment.

Referring again to FIG. 2, according to embodiments, establishing the current payload for referencing from the NFT in step 202 further includes, in step 204, receiving a designation of a computer file for use as the current payload 302 (shown in FIG. 3) from a creator-user via a graphical user interface (GUI) displayed on an electronic display of a creator-user electronic device. Referring to FIGS. 2 and 8, step 202 may further include, in step 206, displaying a make-token button 804, 810 in the creator-user GUI 802, followed by, in step 208, receiving actuation of the make-token button 804 or 810 in the GUI by the creator-user.

FIG. 8 is a diagram of a graphical user interface 800 showing a payload control display and controls 802 for controlling transactions related to a current payload 302, according to an embodiment. The embodiment 800 shown in FIG. 8 illustrates, when displayed on an electronic display to a user, displaying a make-token button 804, indicated as "TOKENIZE", in the creator-user GUI 802, as described in step 206. Referring to FIGS. 2 and 8, step 202 may further include, in step 206, displaying the make-token button 804, 810 in the creator-user GUI 802, followed by, in step 208, receiving actuation of the make-token button 804 or 810 in the GUI by the creator-user.

Referring to FIGS. 2, 3 and 8, as used herein, the terms user and creator-user may be considered synonymous unless context dictates otherwise. For example, as indicated below, a consumer-user may receive the token 312 and, via the carried data 314 in the token 312, access the payload selected by the creator-user. To describe this scenario, the terms creator-user and consumer-user are used in place of user for the purpose of improving clarity of description. According to an embodiment, receiving a user actuation of the tokenize button 804 amounts to receiving actuation of the make-token button 304 in the GUI by the creator-user, as described in step 208.

According to an embodiment, storing the current payload 302 at the current payload network address 304 in step 210 includes storing the current payload at a content identified (CID) network address. For example, storing the current payload 302 at the current payload network address 304 in step 210 includes storing the current payload 302 at an interplanetary file system (IPFS) network address and/or a FileCoin network address.

According to embodiments, creating the linking payload 306 carrying the reference to the current payload network address 304, in step 212, includes creating a JavaScript Object Notation (JSON) file including an equivalency table referencing the current payload network address.

An example of a JSON file including a reference to a current payload is shown below in Example 2:

---

EXAMPLE 2

Metadata:
{
  "keywords": [ ],
  "isArchived": false,
  "isSharingAgreement": false,
  "isPublic": false,
  "isNDA": false,
  "isThumbnail": true,
  "isProtected": true,
  "isTokenPayload": false,
  "isIcon": false,
  "isStream": false,
  "isExec": false,
  "isMacro": false,
  "isGUI": false,
  "isUser2Control": false,
  "isContract": false,
  "_id": "6058a59d6fb007487ce95fbe",
  "schemaVersion": 1,
  "projectId": "6058a5216fb007487ce95fb7",
  "title": "thumbnail-Screenshot from 2021-03-22 07-11-00.png",
  "owner": "6058a50a6fb007487ce95fb6",
  "meta": {
    "fileData": [
      "png"
    ],
    "filePreview": "",
    "emailOwner": "test@test.com"
  },
  "proof": "6058a59d6fb007487ce95fbd",
  "IPFS_OriginalHash":
"QmdEap5fqHFU4YFoYuNKAdn1d1mU7vjwUQg3jW2XoGnBk1",
  "sha256_Hash":
"c447e54e42811e41484ad5c4ba451cfc3857aa5a51569a3d863d9c8f80f18571",
  "txId":
"681c95f8edaf83ec3278e793dc188ca2d093f2b4e695be9ca9b29f613e13b3f6",
  "IPFS_retrievalHash":
"QmQiDqhsDtx2Ww6zEm74HYKY1QamnTFEvyW2GH7vt25gQt",
  "_v": 0
}

---

Optionally, some of the payload context characteristics shown in Example 2 (e.g., "isArchived", "isSharingAgree-ment", etc.), proof data, etc. may be omitted by setting "schemaVersion": NotEqual1, in which case the payload context is set by a specified "schemaVersion" value. For example, "schemaVersion" characteristics may be provided by the token, or by specifying a blockchain TXID referencing a schema definition storage location, which provides an on-chain specification of token schema. Additionally, or alternatively, token data context may be specified by equivalences saved at a CID, url, or IP address carried in the <token_document_url> (see Example 1), or equivalently, "document URL": (see FIG. 12) field.

According to some embodiments, creating the linking payload 306 carrying the reference to the current payload network address in step 212 includes creating an image containing a link to the current payload network address. For example, creating the linking payload 306 carrying the reference to the current payload network address in step 212 may include creating an image of a JSON file in a PDF format, the image of the JSON file including a link to the current payload network address. In another example, creating the linking payload 306 carrying the reference to the current payload network address in step 212 may include encoding a JSON file in a machine-readable symbol, such as in a payload formatted in a .txt or .pdf format.

Figure 9:
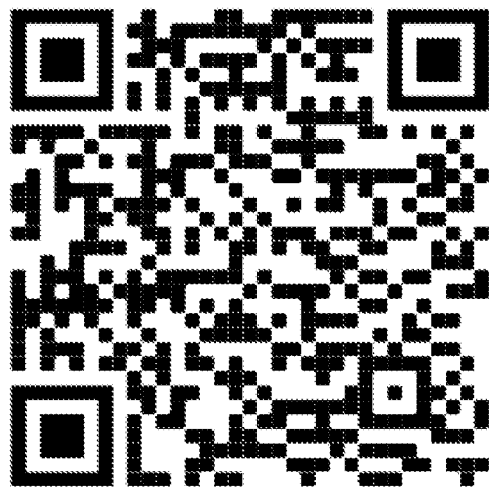
FIG. 9 is an illustrative image of an image referenced by an electronic token, wherein the image forms a linking payload, according to an embodiment.

FIG. 9 is an example of a linking payload 900 embodied as a machine-readable symbol, according to an embodiment.

In another embodiment, creating the linking payload 306 carrying the reference to the current payload network address in step 212 includes encoding a link to the current payload network address in an image using steganography. For example, creating the linking payload 306 carrying the reference to the current payload network address in step 212 may include creating a reduced-resolution image of the current payload with the link to the current payload network address included in the reduced-resolution image of the current payload using steganography.

In an embodiment, a reduced-resolution image of the current payload includes a current token icon.

Figure 10:
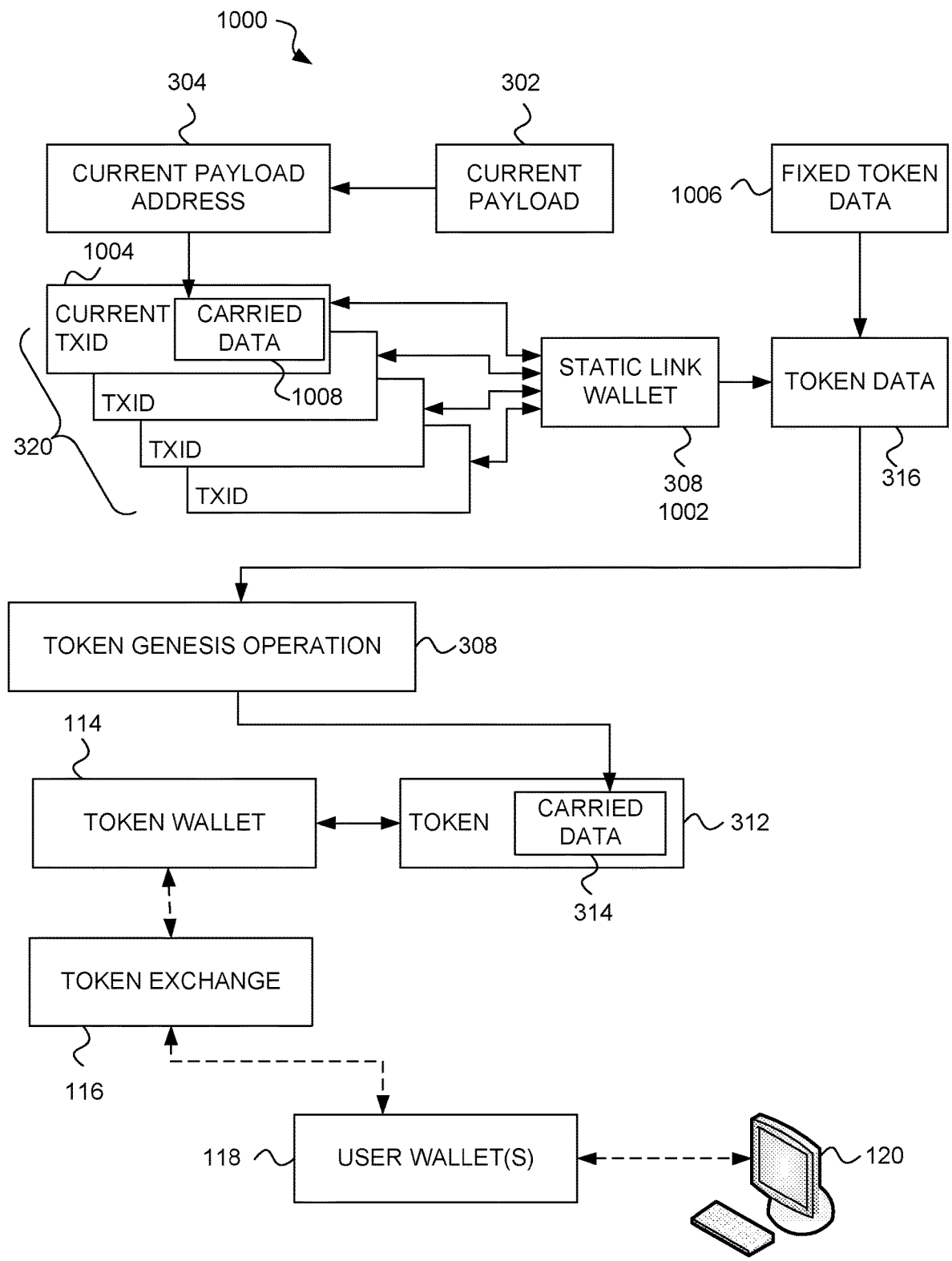
FIG. 10 is a flow chart showing a computer method for creating an electronic token defined by fixed token data and by mutable token data, and for loading mutable data, according to an embodiment.

FIG. 10 is a diagram 1000 showing relationships between current payload data 302 and an electronic token 312 referencing the current payload data, according to an embodiment.

As described above, embodiments herein relate to creation and use of electronic tokens that include an immutable data portion and a mutable data portion. In other words, the current payload 302 may be subject to change after the electronic token 312 is generated.

Referring to FIGS. 2 and 10, establishing the static link network address 308, 1002 different than the current payload network address 304 in step 214 may include establishing an electronic wallet 308, 1002. Executing the linking transaction 320 in step 216 to associate the linking payload 306 with the static link network address 308 may include broadcasting a blockchain transaction 1004 involving the electronic wallet 308, 1002 and carrying a link to the current payload network address 304. The link to the current payload network address 304 may be included in a memo field associated with the blockchain transaction 1004. For example, the link to the current payload network address 304 may be included in an OP_RETURN field associated with the blockchain transaction.

Referring again to FIGS. 3, 8 and 10, the graphical user interface 800 may include a control 806 to update the current payload to a new current payload. When the server computer receives the update command, in the context of an electronic token, the server computer may save the (optionally encrypted) new payload to a new payload CID 304 and broadcast a blockchain transaction 1004 carrying the new payload address 304, with the static link wallet 308, 1002 as an input and/or output of the transaction. This may cause the token 312, and particularly the carried data 314 in the token 312 to access the updated payload by referencing the static link wallet 308, 1002, performing block exploration to find a most recent blockchain transaction 1004, reading the carried data 1008 in the blockchain transaction 1004, and accessing the (new) current payload address 304, by following a reference to the current payload CID 304 included in the carried data 1008. The current payload CID 304 may be directly referenced by the carried data 1008 or may alternatively be reference by way of a metadata file, as shown in FIG. 11.

Figure 11:
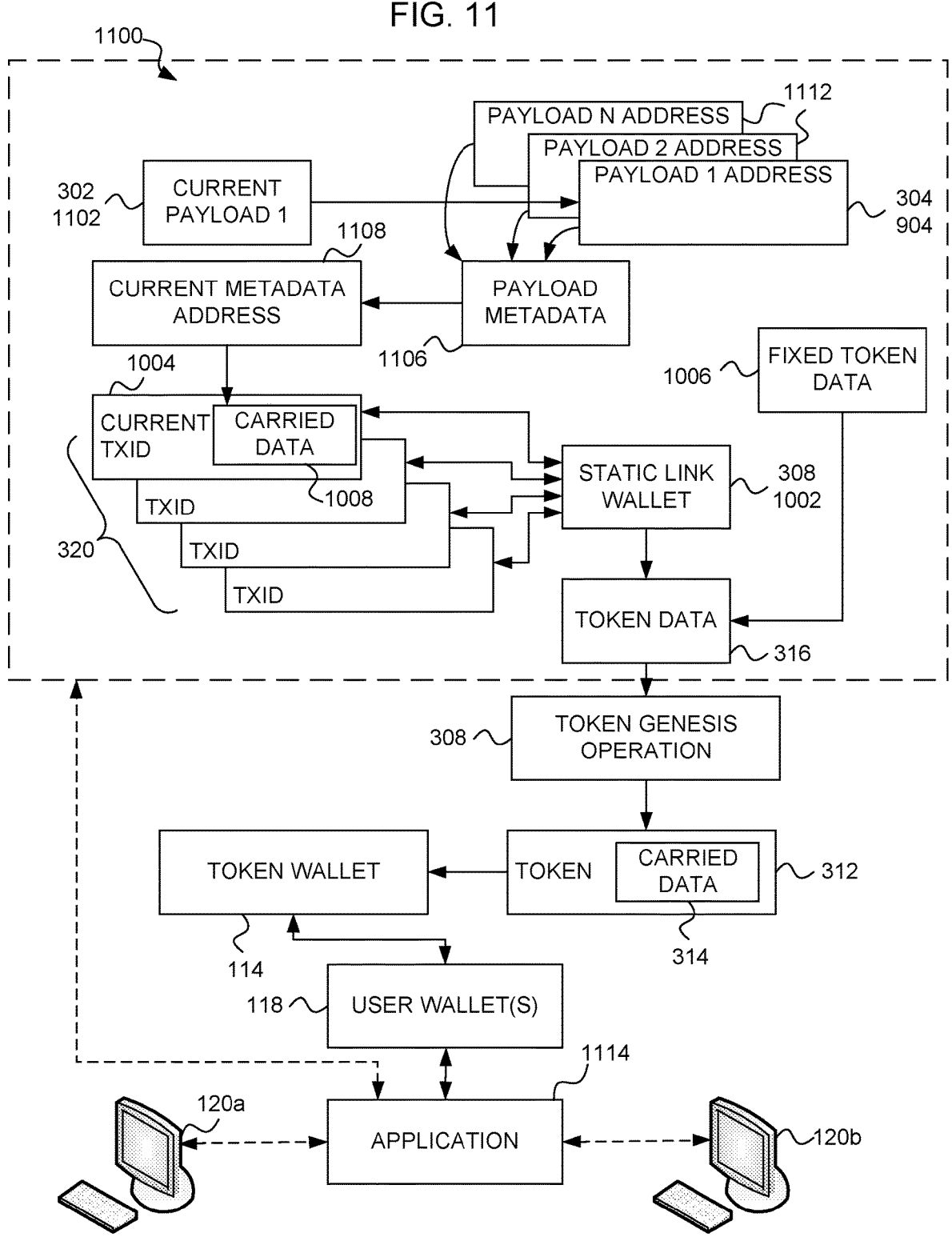
FIG. 11 is a flow chart showing a computer method for creating an electronic token defined by fixed token data and by mutable token data, and for loading mutable data, according to another embodiment.

FIG. 11 is a diagram 1100 showing relationships between current payload data 302 and an electronic token 312 referencing the current payload data, according to another embodiment. As shown in FIG. 11, creating the linking payload 306 may include creating a payload metadata file 306, 1106 including a reference to the current payload 302, 1102 via the current payload network address 304, 904. The method 200 may include saving the payload metadata file 1106 to the metadata network address 1108. Establishing the static link network address 308 different than the current payload network address 304 in step 214 may includes establishing an electronic wallet 308, 802. Executing the linking transaction 320 in step 216 to associate the linking payload 1106 with the static link network address 308, 802 may include broadcasting a blockchain transaction 1004 involving the electronic wallet 308, 802 and carrying a link to the metadata network address 1108. As described above, the link to the metadata network address 1108 may be included in a memo field associated with the blockchain transaction. For example, the link to the metadata network address 1108 may be included in an OP_RETURN field associated with the blockchain transaction 1004.

According to embodiments, the current payload may include a plurality of current payloads 1112. The payload metadata file 1106 may include references to the plurality of current payloads 1112. The payload metadata file 1106 may include, for each of the plurality of payloads 1112, at least one designator indicating a function of each of the plurality of payloads 1112. The payload metadata 1106 may include mutable data 1216 (shown in FIG. 12) referenced by the token 312. The payload metadata may include a JSON file. The payload metadata 1106 may include a reference to a metadata coding schema. The payload metadata 1106 may include a reference to a metadata coding schema plus metadata to be interpreted as per the metadata coding schema.

For example, a Payload 1 304, 904 may include a creative work, and a second payload, Payload 2, may include a contract controlling use of the creative work. For example, where the creative work is a computer program, Payload 2 may include an opensource license and/or a royalty bearing license.

An example of a payload metadata file 1106 is shown in Example 1, above.

As an alternative to specifying a static link wallet 802 as a static link address, embodiments may include, in a mutable data linking field in the token data 316, specifying a transaction ID (TXID) referenced to an electronic wallet 802. The current payload may be determined by identifying a most recent TXID referenced to the electronic wallet 802, with carried data in the most recent TXID linking to the current payload.

Figure 12:
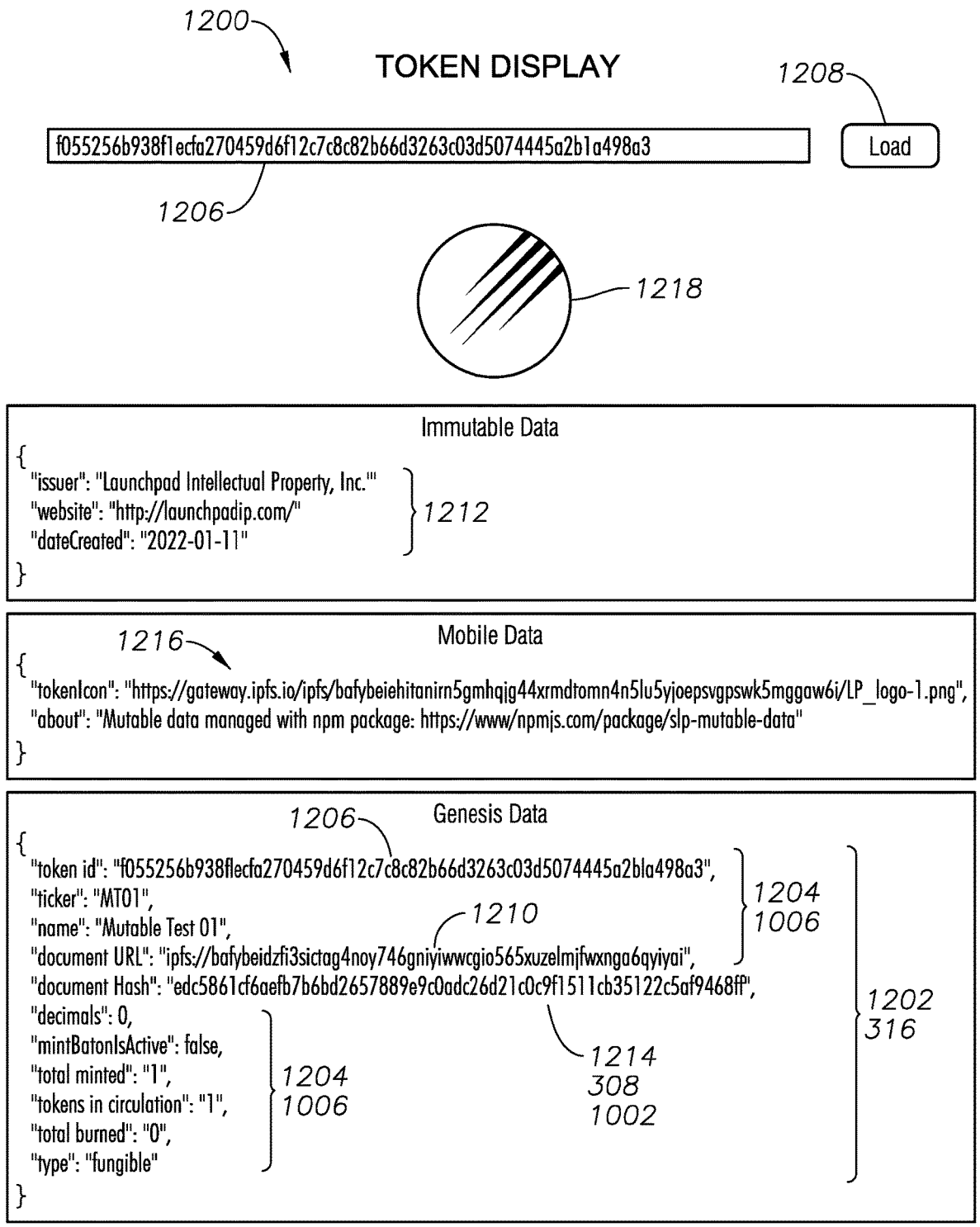
FIG. 12 is a display of token data, according to an embodiment.

FIG. 12 is a display of token data 1200, according to an embodiment. A token viewer program provided the output (not including reference numbers etc.) of FIG. 12. Entry of a token ID 1206 and actuation of a Load control 1208 by a user into a GUI (not shown) causes the token viewer to retrieve token genesis data 1202, 316, Immutable Data 1212, Mutable Data 1216 and a payload 1218 pointed to by the Mutable Data 1216 and to display same. The inventors contemplate making the token viewer program available to others.

As indicated above, the electronic token 312 may be created according to the simple ledger protocol (SLP) standard, for example referenced to the Bitcoin Cash (BCH) blockchain or other blockchain supporting at least one OP_RETURN or equivalent field. The electronic token 312 may literally be a fungible token, with genesis data specifying a non-divisible fixed quantity, with no minting baton. With these suitable parameters, the token has characteristics of an NFT. Proof for trustless use may be maintained by referencing token data to blockchain transactions, and, of course, creating the token in a blockchain-tracked token genesis transaction. The token genesis transaction identity, "TXID" or "token id", is shown as 1206. The token id is known upon broadcast of the genesis transaction and proved upon receipt of a subsequent block proof. Other portions of the token data, including a fixed (immutable) data portion 1204, 1006 and a pointer to a mutable data portion ("document Hash") 1214, 308, 1002 are loaded into the genesis transaction 308 by a party responsible for token genesis. The party responsible for token generation is shown as 1212.

The token 312 may additionally or alternatively be created as a purely non-fungible token, such as an SLP Type 65 token or an ERC-721 token, for example.

Referring again to FIGS. 1, 3, 10, and 11, according to embodiments, blockchain transactions defining a payload 302, 1102 may be referenced to a hierarchical deterministic (HD) wallet having addresses and public keys associated with a first derivation path. Blockchain transactions defining a token for carrying access to a payload may be associated with a second derivation path deterministically related to the first derivation path, within the same HD wallet. Blockchain transactions defining the static link wallet 308, 1002 may be associated with a third derivation path deterministically related to the first and second derivation paths and within the same HD wallet. The inventors contemplate that using fixed relationships between derivation paths referenced to the token may reduce computation resource requirements in a server computer.

According to embodiments, the static link address comprises a transaction ID (TXID) 320 referenced to an electronic wallet 308, 1002, such that the current payload is referenced by a most recent TXID 1004 referenced to the electronic wallet 1002.

In an embodiment, executing the linking transaction, step 216 in FIG. 2, may include storing the linking payload 306 at a static link network address 308. For example, executing the linking transaction in step 216 may include storing the linking payload at an interplanetary name service (IPNS) network address. Use of IPNS may be useful in use cases where on-chain tracking of an immutable payload address is not important and/or not appropriate. Similarly, executing the linking transaction in step 216 may include storing the linking payload at a uniform resource locator (URL) or an Internet Protocol (IP) address.

As described elsewhere herein, the static link network address 308 may include a blockchain wallet 1002. In this case, executing the linking transaction 320 in step 216 may include broadcasting a blockchain transaction 1004 involving the blockchain wallet 1002. Broadcasting the blockchain transaction involving the blockchain wallet 1002 may include broadcasting the blockchain transaction with carried data 1008 including reference data linking to the current payload network address 304.

A "trust merchant" and/or "trust computer application" may optionally manage access to payloads. A permission for a user to access a payload may be recorded in a sharedWith array in payload metadata, as shown in Example 3, below. According to embodiments, the objects in the sharedWith array track users that have had the payload shared with them, but it does not track permissions for accessing the payload.

EXAMPLE 3

```
"sharedWith": [
  {
    "email": "inventor2022@gmail.com",
    "id": "6058a6932efdb04b0e9d7d56",
    "isShadowUser": false,
    "isTokenHolder": true
  }
]
```

According to embodiments, access control permissions to a payload may be defined in a sharedPermissions array. The objects in the sharedPermissions array may define a 'matrix' of permissions. Each user and payload may fall within the sharedPermissions matrix:

User Role: owner, admin, can-download, view-only.
Accessibility: public (not encrypted), private (encrypted, default).
Time Limit: no limit, 30 days, 24 hours, custom.
Payload state: active, archived, deleted.
Sharing permission: yes, no An example of the shared Permissions array in payload metadata is shown below in Example 4:

EXAMPLE 4

```
"sharedPermissions": [
  {
    "email": "user1@userland.com",
    "userId": "6058a50a6fb007487ce95fb6",
    "shareLevel": 20,
    "shareLevelText": "view-only-time-based",
    "shareEndDate": 1619014652,
    "sharingPermission": no
  },
  {
    "email": "user2@userland.com",
    "userId": "6058a50a6fb007487ce95fb7",
    "shareLevel": 30,
    "shareLevelText": "can-download",
    "shareEndDate": 1619015421,
    "sharingPermission": yes
  }
]
```

According to embodiments, the shareLevel parameter indicates how the user may interact with the payload. For example, in a share level 20 instance, the user 6058a50a6fb007487ce95fb6 may view the payload, for example as a .pdf file displayed on the user's screen but may not download the actual file. This may provide a measure of security in that the user 6058a50a6fb007487ce95fb6 cannot download the payload in its native file format, such as .docx for example, and freely use the payload.

According to an embodiment, a view-only file is watermarked prior to display, and the watermark value recorded in the file access history. The watermark may be embedded in the document via steganography in such a way that the user 6058a50a6fb007487ce95fb6 knows the file is watermarked but does not know how to remove the watermark. If the user 6058a50a6fb007487ce95fb6 wishes to access the original file, the user 6058a50a6fb007487ce95fb6 may request an upgrade in share level from the owner or admin of the project.

The shareEndDate sets a date and time when the viewing privilege expires. This may be used, for example, when a payload author seeks review from user 6058a50a6fb007487ce95fb6, but does not wish for the user to have indefinite access to what may be sensitive information. For example, if a user wishes to share a sensitive medical record with a specialist physician or health care practitioner sufficient to receive treatment but does not wish for the physician or practitioner to continue to have access when the treatment is anticipated to be over, the user may set an expiration date on the shared data, which causes the shareEndDate to be set.

In another example shown in the illustrative shared Permissions array, the same payload may be shared with a second user, 6058a50a6fb007487ce95fb7, according to a "can-download" term. For example, a user 6058a50a6fb007487ce95fb7 having a "can-download" status may download the original payload (or a watermarked version of the original payload) in its native format. This may be useful when the owner of the payload wishes to collaborate with the user 6058a50a6fb007487ce95fb7 and seeks revision of the original document. The "can-download" parameter may additionally or alternatively be used when the payload is a machine-readable payload that needs to be in its original format to be useable by the user 6058a50a6fb007487ce95fb7. For example, if the payload is an output file from a 3-D or tomographic scan, the user 6058a50a6fb007487ce95fb7 may need the output file in its original format to view or otherwise use the payload. Similarly, if the payload is a driver file for a device such as a CNC machine, a 3D printer, a computer plotter, etc., the shareLevel "can-download" parameter may be used to deliver the payload for its intended use.

Figure 13:
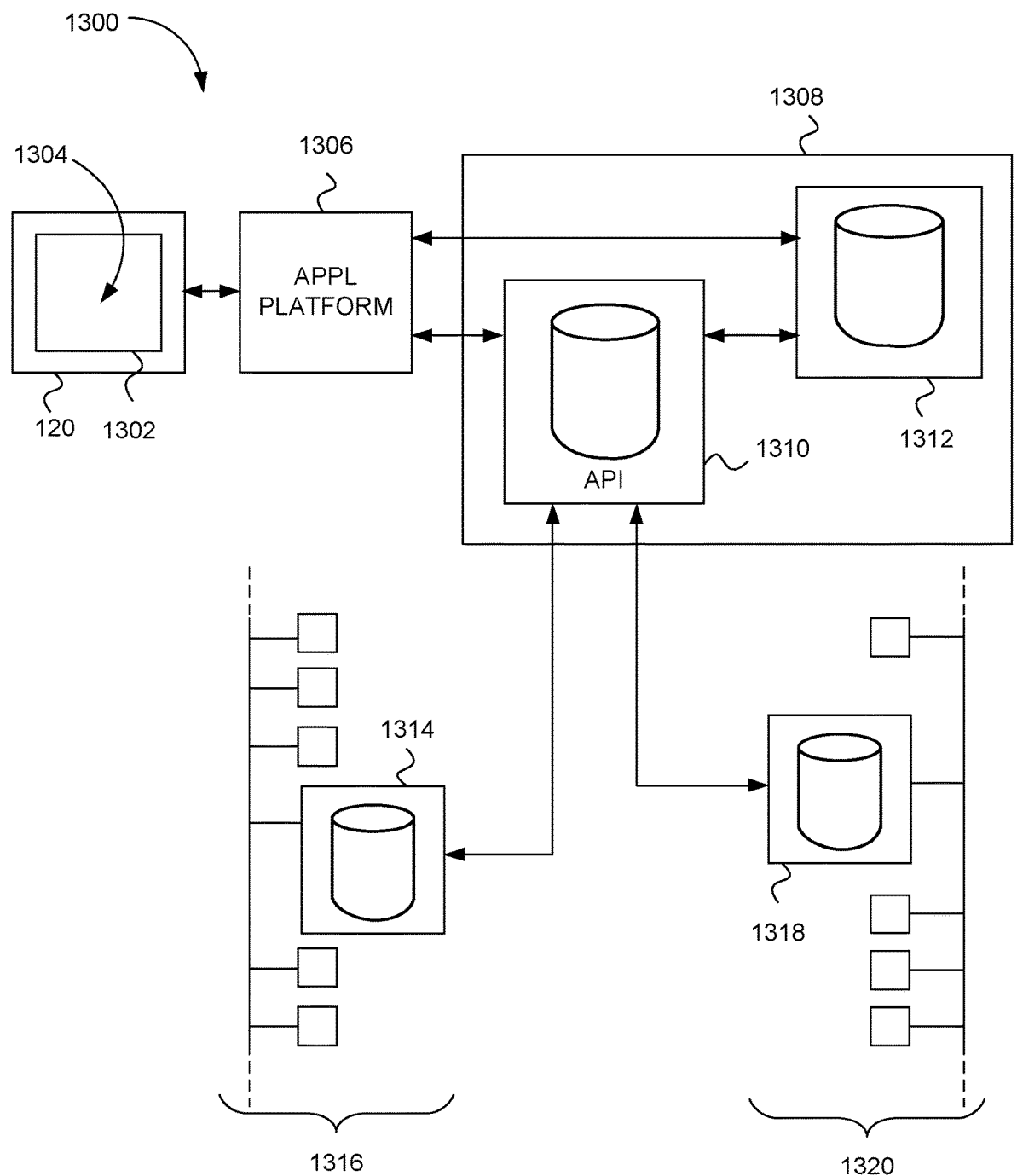
FIG. 13 is a diagram of a computer system for executing the computer methods of FIGS. 1, 2, 10, and 11, according to an embodiment.

FIG. 13 is a diagram of a computer system for executing the computer methods of FIGS. 1, 2, 10, and 11, according to an embodiment. Referring to FIGS. 2, 10, 11, and 13, a computer method for linking an electronic token 312 to a computer file may include, in step 204, receiving, from a user via a graphical user interface 1304 displayed on an electronic display 1302 of a user computing device 120 (e.g., see the GUI shown in FIGS. 4, 5, and 6) into a server computer 1308, a designation of a computer-readable electronic file 302, 502 for linking to an electronic token 312. Proceeding to step 210, the electronic file may be stored in a content-identified network storage system such as IPFS 1316, specifically a node 1314 of IPFS 1316 operatively coupled to the server computer 1308, including determining a content identifier (CID) corresponding to a storage location 304, 1108 of the electronic file 302, 502 or a metadata file with a pointer to the storage location of the electronic file. The method may further include broadcasting a blockchain 1320 transaction 1004 carrying the CID, the blockchain transaction specifying, as an end point, a wallet address 308, 1002 referenced by data associated with an electronic token. For example, the blockchain transaction 1004 may associate a new payload file 302, 1102 replacing previous blockchain transactions 320 that associated previous payload files. In another embodiment, the new payload file 302, 1102 and/or new metadata file 1106 may augment previous payload or metadata files 302, 1102, 1106. The data associated with the electronic token may include a document hash set equal to the original TXID in which the original payload was associated with a payload wallet address. As described elsewhere, that TXID may be viewed by a block explorer to determine the endpoint wallet address, the endpoint wallet address may be explored to determine a most recent TXID, and the most recent TXID may be viewed to determine a linking CID. The linking CID may include a CID to access a linking file, such as a JSON file, which is fetched and parsed to determine a uniform resource indicator such as a most recent payload CID, and the most recent payload may be fetched from the most recent payload CID. In another embodiment the linking CID may directly refer to the most recent payload CID. In another embodiment, the electronic token data may include the endpoint wallet address, and the most recent TXID may be determined directly from the wallet address specified in the electronic token data.

In an SLP token, the document hash field used to point to mutable data is specified in a way that it will only accept a TXID (and will not accept a wallet address). For this reason, for SLP token specifications (Type 1 and Type 65) current as-of the present application, the original TXID is used as the first "breadcrumb" for discovering the current linking file CID and/or the current payload CID.

The method 200 may further include receiving, from a token-holder user via a graphical user interface into the server computer, actuation of a control corresponding to the electronic token 312, for example after transferring the electronic token in step 220 to a second user. The method 200 may include accessing one or more current payload(s) in step 222, such as by responsively reading, from data associated with the electronic token, the initial mutable data-defining TXID (see FIG. 12, 1214, 308, 1002). The method may further include performing or calling block exploration to determine one or more blockchain transactions 1004, 320 associated with the wallet address 308, 1002 referenced by the original or initial TXID, and selecting a most recent blockchain transaction 1004 from the one or more blockchain transactions 320. The method may include reading the most recent blockchain transaction, parsing the CID from carried data 1008 from the blockchain transaction 1004. The method may proceed to downloading the electronic file 302, 1102 from the content-identified network storage system and displaying the electronic file 302, 1102 to the token-holder user via the graphical user interface. For example, see the "token icon" 1218 displayed in the GUI of FIG. 12.

A particular electronic file 1102 associated with the electronic token 312 may be addressed by the CID 304 carried in the most recent blockchain transaction 1004 referenced to the wallet address 1002 referenced by the original or initial TXID. A history of particular electronic files 302 associated with the electronic token 312 may be addressed by respective CIDs carried by a history of blockchain transactions 320 specifying the wallet address 1002 as an endpoint.

Referring to FIG. 8, in an embodiment, receiving actuation of a control 806 to update a payload associated with a token causes the server computer to drive the GUI to display an add payload display (FIG. 4, 402) and controls (FIG. 5, 504) for receiving a designation of a new payload via a new payload control 502. The server computer may responsively save the new payload at a new payload network address (CID) 304 (or optionally, a CID 1108 corresponding to payload metadata file 1106) and causing carrying of the new payload network address as carried data 1008 in a new blockchain transaction 1004.

Causing carrying of the new payload network address as carried data 1008 in a new blockchain transaction 1004 may include broadcasting the blockchain transaction including inserting the current payload network address into an OP_RETURN field of the blockchain transaction.

The method 200 may further include creating a linking payload, the linking payload including a reference to the current payload network address and storing the linking payload at a linking payload network address. The static network address may include a payload blockchain wallet. The method 200 may further include broadcasting a blockchain transaction involving the payload blockchain wallet, the blockchain transaction including the linking payload network address as carried data.

The linking payload may include a Javascript Object Notation (JSON) file or image of the JSON file, the JSON file including a listing of the current payload network address. The linking payload may include a low-resolution version of the payload with the payload network address or a static link wallet 308, 1002 steganographically carried in a low-resolution version of the payload.

Referring to FIG. 8, a computer method for updating a payload file corresponding to a previously generated electronic token referencing a specified electronic wallet includes displaying an update-token button 806 in a creator-user GUI displayed on an electronic display of a creator-user computing device and receiving actuation of the update-token button 806 in the GUI by the creator-user. The method may include displaying an Add new Document creator-user GUI (FIG. 5, 504) and receiving a designation of a new computer file for use as a new current payload from the creator-user. The method may include, with a server computer, saving the designated computer file at a payload CID, inserting the payload CID into a new metadata file, saving the new metadata file at a new metadata CID, and broadcasting a blockchain transaction carrying the new metadata CID, the blockchain transaction specifying the referenced electronic wallet as an endpoint. In this way, the electronic token is updated to link to the new computer file.

The metadata file may include a new JSON file or image of the new JSON file, the new JSON file or image of the new JSON file including a listing of the new current payload network address. The new JSON file may include a listing of both the previous current payload network address and the new current payload network address. In this way, the token carries a revision history of the linked payload.

While many embodiments described herein refer to providing a GUI to a user for directly controlling linking of a token to a payload file, the inventors anticipate providing token control interfaces to creators of use-case software that makes use of electronic tokens with mutable data. For example, referring to FIG. 11, the inventors anticipate that an application 1114 may be provided to first and second user devices 120a, 120b. The application may call the processes described herein as an application "back-end" that manages received payloads 302, 1102, electronic wallets 3008, 1002, and blockchain transactions 320, 1004 that maintain a public record of mutable data tokens used by the application 1114. Such applications 1114 may be quite varied such as, for example, intellectual property management, intellectual property asset trading, innovation collaboration, Human Resources management of employee training, commodity management, trading, and clearing, electronic artwork trading, encrypted communications, data file certification for cloud storage systems, library lending, electronic commerce, computer gaming asset management, metaverse asset management, music distribution, travel booking, routing, and ticketing, gambling, ESG certification, carbon credit accounting and management, physical art distribution and management, education, guided business negotiation, social networking, news media distribution and verification, computer network management and security, remote computer processing data flow, goods fabrication management, agricultural product certification, and medical records.

A particular advantage of computer methods and systems described herein includes transparency of records by virtue of on-chain recording of electronic token content.

According to embodiments, a computer method 1400 for responding to an actuation of a displayed electronic token identifier corresponding to a "mutable-data" token made according to computer methods described above is described below. The method 1400 relates to responding to a consumer-user, who currently holds the token. Method 1400 begins, in step 1402, with receiving actuation into a server computer, by a consumer-user via a GUI displayed on a consumer-user electronic device, of an electronic token identifier. Responsively, in step 1404, the token data associated with the electronic token is parsed to obtain a block chain transaction identity (TXID) associated with at least one payload data file. Because token genesis data cannot be changed once the token is made, this TXID may be referred to as an "original TXID" or "initial TXID".

Step 1406 includes reading an electronic wallet address endpoint associated with the TXID. Proceeding to step 1408, a most recent block chain TXID associated with the electronic wallet address is discovered, followed by, in step 1410, reading, from carried data associated with the most recent block chain TXID, a content identifier (CID). Step 1416 includes fetching current payload data corresponding to the CID from a content-identified storage network (such as IPFS or Filecoin). In step 1418, the current payload data may be rendered to the consumer-user via the consumer-user device.

In an embodiment, the CID discovered in the most recent TXID may be a CID to a linking file. Accordingly, the method 1400 may include, in step 1412, fetching a linking file stored at the CID (specified by the most recent TXID), and in step 1414, parsing, from the linking file, a payload data CID prior to, in step 1418, fetching the current payload data from the payload data CID. Fetching the linking file may include fetching a Javascript Object Notation (JSON) file.

In an embodiment, the payload data CID and payload data corresponds to a token icon. In such a case, a full-sized image referenced by the electronic token may be obtained by reading the immutable token data, parsing a payload address (e.g. included as a "document url" field) such as an immutable payload CID from the token data, and fetching the immutable payload from the payload address).

Typically, during token genesis, payload data, including immutable payload data and mutable payload data, is "pinned" to an IPFS node at their respective CIDs, such that the payload data are retained and available to the consumer-user. In one embodiment, this is performed by calling a pay-to-write service (or database) such as P2WDB, available from GITHUB™. Similarly, an updated or added payload data file is typically pinned to keep it available.

In the computer method 1400, step 1410 (reading, from carried data associated with the most recent TXID, CID includes reading an OP_Return field carried by the most recent TXID.

Reading the electronic wallet address endpoint associated with the TXID, in step in step 1406 includes calling a block explorer program to view the TXID data.

In step 1404, wherein parsing, from token data associated with the electronic token, the transaction identity (TXID) associated with at least one payload data file includes parsing a document hash field (e.g., a field defined in SLP token specifications).

The computer method 1400 may further include, in step 1420, parsing, from an immutable portion of the token data, a fixed payload CID. In step 1422, the fixed payload may be fetched from the fixed payload CID stored by the content-identified storage network, and, in step 1424, rendering the fixed payload to the consumer-user via the consumer-user electronic device.

Rendering the mutable data payload in step 1418, and or rendering the fixed data payload in step 1424 to the consumer-user via the consumer-user electronic device may include displaying the payload on an electronic display of the consumer-user electronic device. In another embodiment, rendering the payload to the consumer-user via the consumer-user electronic device (in step 1418 and/or 1424) includes playing an audio file via an audio output of the consumer-user electronic device.

The block chain to which the electronic token and the mutable payload is referenced may include an Unspent Transaction Output (UTXO) blockchain such as Bitcoin, Bitcoin Cash, Bitcoin BVT, E-Cash, Avalanche X-chain, or other Bitcoin-derived blockchain. Accordingly, parsing, from token data associated with the electronic token, the block chain TXID associated with at least one payload data file in step 1404 may include parsing an Unspent Transaction Output (UTXO) blockchain TXID.

Receiving actuation into a server computer, by a consumer-user via a GUI displayed on a consumer-user electronic device, of an electronic token identifier may include receiving a command to open a consumer-user electronic wallet to which the electronic wallet has been transmitted. Fetching current payload data corresponding to the CID from a content-identified storage network in step 1416 may include fetching a token icon. Rendering the current payload data to the consumer-user via the consumer-user device in step 1418 may include displaying the token icon in the context of the consumer-user electronic wallet.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A computer method for providing access to payload data using an electronic token, comprising:
   transmitting, from a server computer to a user device via an internetwork, data to cause electronic display, to a user, of a use-case graphical user interface (GUI) including a GUI control operatively coupled to a command to establish a current payload file corresponding to a designated electronic file;
   receiving, into the server computer, the command from the user for establishing the current payload file by the server computer;
   storing, with the server computer, the current payload file at a current payload network address;
   creating, with the server computer, a linking payload, the linking payload carrying a reference to the current payload network address;

establishing, with the server computer, a static link network address different than the current payload network address for accessing the linking payload;

executing, with the server computer, a linking transaction to associate the linking payload with the static link network address; and executing, with the server computer, a genesis transaction to generate an electronic token referencing the static link network address or the linking transaction identity (TXID) as carried data.

2. The computer method for providing access to payload data using the electronic token of claim 1, wherein establishing the current payload further comprises:

receiving a designation of a computer file for use as the current payload from a creator-user via a creator-user graphical user interface displayed on an electronic display of a creator-user electronic device;

displaying a make-token button in the creator-user GUI; and receiving actuation of the make-token button in the GUI by the creator-user.

3. The computer method for providing access to payload data using the electronic token of claim 1, wherein storing the current payload at the current payload network address includes storing the current payload at a content identified network address (CID).

4. The computer method for providing access to payload data using the electronic token of claim 1, wherein storing the current payload at the current payload network address includes storing the current payload at an interplanetary file system (IPFS) network address and/or a FileCoin network address.

5. The computer method for providing access to payload data using the electronic token of claim 1, wherein creating the linking payload carrying the reference to the current payload network address includes creating a JavaScript Object Notation (JSON) file referencing the current payload network address.

6. The computer method for providing access to payload data using the electronic token of claim 1, wherein the current payload is subject to change after the electronic token is generated.

7. The computer method for providing access to payload data using the electronic token of claim 1, wherein establishing the static link network address different than the current payload network address includes establishing an electronic wallet; and wherein executing the linking transaction to associate the linking payload with the static link network address includes broadcasting a blockchain transaction involving the electronic wallet and carrying a link to the current payload network address.

8. The computer method for providing access to payload data using the electronic token of claim 7, wherein the link to the current payload network address is included in a memo field associated with the blockchain transaction.

9. The computer method for providing access to payload data using the electronic token of claim 8, wherein the link to the current payload network address is included in an OP_RETURN field associated with the blockchain transaction.

10. The computer method for providing access to payload data using the electronic token of claim 1, wherein creating the linking payload includes creating a payload metadata file including a reference to the current payload via the current payload network address;

further comprising:

saving the payload metadata file to a metadata network address;

wherein establishing the static link network address different than the current payload network address includes establishing an electronic wallet; and wherein executing the linking transaction to associate the linking payload with the static link network address includes broadcasting a blockchain transaction involving the electronic wallet and carrying a link to the metadata network address.

11. The computer method for providing access to payload data using the electronic token of claim 10, wherein the link to the metadata network address is included in a memo field associated with the blockchain transaction.

12. The computer method for providing access to payload data using the electronic token of claim 11, wherein the link to the metadata network address is included in an OP_RETURN field associated with the blockchain transaction.

13. The computer method for providing access to payload data using the electronic token of claim 1, wherein the electronic token comprises a simple ledger protocol (SLP) token.

14. The computer method for providing access to payload data using the electronic token of claim 13, wherein the electronic token comprises a SLP Type 1 token with no minting baton.

15. The computer method for providing access to payload data using the electronic token of claim 1, wherein the static link address comprises a transaction ID referenced to an electronic wallet;

wherein the current payload is referenced by a most recent transaction ID referenced to the electronic wallet.

16. The computer method for providing access to payload data using the electronic token of claim 1, wherein the static link network address includes a blockchain wallet;

wherein executing the linking transaction includes broadcasting a blockchain transaction involving the blockchain wallet; and wherein broadcasting the blockchain transaction involving the blockchain wallet includes broadcasting the blockchain transaction with carried data, the carried data including reference data linking to the current payload network address.

17. A non-transitory computer-readable medium carrying computer instructions that, when executed by one or more processors of a server computer, cause the server computer to execute operations comprising:

transmitting, from the server computer to a user device via an internetwork, data to cause electronic display, to a user, of a use-case graphical user interface (GUI) including a GUI control operatively coupled to a command to establish a current payload file corresponding to a designated electronic file;

receiving, into the server computer, the command from the user for establishing the current payload file by the server computer;

storing, with the server computer, the current payload file at a current payload network address;

creating, with the server computer, a linking payload, the linking payload carrying a reference to the current payload network address;

establishing, with the server computer, a static link network address different than the current payload network address for accessing the linking payload;

executing, with the server computer, a linking transaction to associate the linking payload with the static link network address; and executing, with the server computer, a genesis transaction to generate an electronic token referencing the static link network address or the linking transaction identity (TXID) as carried data.

18. A computer method for updating a payload file corresponding to a previously generated electronic token referencing a specified electronic wallet address or a transaction identity (TXID) associated with the specified electronic wallet address, comprising:

displaying an update-token button in a creator-user graphical user interface (GUI) on an electronic display of a creator-user computing device;

receiving actuation of the update-token button in the GUI by the creator-user;

receiving a designation of a new computer file for use as a new current payload from the creator-user via the creator-user GUI saving the designated computer file at a payload content identifier (CID);

inserting the payload CID into a new metadata file;

saving the new metadata file at a new metadata CID; and broadcasting a blockchain transaction carrying the new metadata CID, the blockchain transaction specifying the referenced electronic wallet address as an endpoint;

whereby the electronic token is updated to link to the new computer file.

19. The computer method for updating the payload file corresponding to the previously generated electronic token referencing the specified electronic wallet of claim 18, wherein the metadata file includes a new JavaScript Object Notation (JSON) file or image of the new JSON file, the new JSON file or image of the new JSON file including a listing of the new current payload network address.

20. The computer method for updating the payload file corresponding to the previously generated electronic token referencing the specified electronic wallet of claim 19, wherein the new JSON file includes a listing of the previous current payload network address and the new current payload network address;

whereby the token carries a revision history of the linked payload.

* * * * *